US012595873B2

(12) United States Patent
Smith et al.

(10) Patent No.: US 12,595,873 B2
(45) Date of Patent: Apr. 7, 2026

(54) ELECTROLYTIC COATING FOR ALUMINUM COMPONENTS WITH WELD JOINTS

(71) Applicant: Hamilton Sundstrand Corporation, Charlotte, NC (US)

(72) Inventors: Blair A. Smith, South Windsor, CT (US); Sophie Lubin, Herblay (FR)

(73) Assignee: Hamilton Sundstrand Corporation, Charlotte, NC (US)

( * ) Notice: Subject to any disclaimer, the term of this patent is extended or adjusted under 35 U.S.C. 154(b) by 104 days.

(21) Appl. No.: 18/492,334

(22) Filed: Oct. 23, 2023

(65) Prior Publication Data

US 2024/0353050 A1 Oct. 24, 2024

(30) Foreign Application Priority Data

Apr. 18, 2023 (FR) ...................................... 2303878

(51) Int. Cl.
| | |
|---|---|
| *F16L 58/08* | (2006.01) |
| *C25D 5/44* | (2006.01) |
| *C25D 5/48* | (2006.01) |
| *C25D 7/04* | (2006.01) |
| *C25D 9/02* | (2006.01) |
| *F16L 9/02* | (2006.01) |

(Continued)

(52) U.S. Cl.
CPC ................ *F16L 58/08* (2013.01); *C25D 5/44* (2013.01); *C25D 5/48* (2013.01); *C25D 7/04* (2013.01); *C25D 9/02* (2013.01); *F16L 13/02* (2013.01); *F16L 9/02* (2013.01); *F16L 58/10* (2013.01); *F16L 58/181* (2013.01)

(58) Field of Classification Search
CPC . F16L 58/08; F16L 58/10; F16L 58/04; F16L 58/181; F16L 13/0254; F16L 13/02; F16L 9/02; F16L 41/02; F16L 41/021; F16L 43/001
See application file for complete search history.

(56) References Cited

U.S. PATENT DOCUMENTS 3,622,473 A 11/1971 Ohta et al.
3,960,676 A 6/1976 Miyosawa et al.
(Continued)

FOREIGN PATENT DOCUMENTS

CN 105276299 A * 1/2016 ................ F16L 9/02
CN 105482580 A * 4/2016
(Continued)

OTHER PUBLICATIONS

CN-105276299-A—Machine Translation—English (Year: 2016).*
(Continued)

*Primary Examiner* — William S. Choi
(74) *Attorney, Agent, or Firm* — Kinney & Lange, P.A.

(57) ABSTRACT

A coated component includes a metallic body defining an inner volume configured to retain a fluid therein. The metallic body includes a plurality of segments, at least one weld joint attaching the plurality of segments, an outer surface, and an inner surface facing and defining the inner volume. The component further includes a chrome-free protective coating disposed on each of the outer surface and the inner surface. The coating includes an epoxy layer, and an oxide layer disposed between the epoxy layer and the respective outer surface and inner surface.

16 Claims, 5 Drawing Sheets

(51) Int. Cl.
    *F16L 13/02*        (2006.01)
    *F16L 58/10*        (2006.01)
    *F16L 58/18*        (2006.01)

(56)            References Cited

U.S. PATENT DOCUMENTS

| | | | | |
|---|---|---|---|---|
| 4,853,297 | A * | 8/1989 | Takahashi | F16L 58/08 |
| 9,969,441 | B2 | 5/2018 | Meister et al. | |
| 2010/0266781 | A1* | 10/2010 | Kusinski | F16L 58/08 |
| 2012/0104172 | A1* | 5/2012 | Haug | F16L 41/021 |
| 2022/0074525 | A1* | 3/2022 | Banerji | F16L 58/08 |

FOREIGN PATENT DOCUMENTS

| | | | |
|---|---|---|---|
| EP | 2143822 | A1 | 1/2010 |
| EP | 3620553 | A1 | 3/2020 |
| EP | 3786320 | A1 | 3/2021 |
| KR | 20150130197 | A | 11/2015 |

OTHER PUBLICATIONS

CN-105482580-A—Machine Translation—English (Year: 2016).*

Aluminum Buttweld Fittings. [online]. ASC. Retrieved from the Internet: <URL: https://web.archive.org/web/20210621133905/https://www.amardeepsteel.com/aluminum-buttweld-fittings.html > (Year: 2021).*

Search Report from French Application No. 2303878, dated Oct. 16, 2023, 15 Pages.

Extended European Search Report for EP Application No. 24159072. 8, dated Oct. 14, 2024, 13 pages.

Partial Search Report for EP Application No. 24159072.8, dated Jul. 19, 2024, 14 pages.

Presentation entitled, "Industrialization of Anaphoretic Coating Process on Aluminium Alloys" from Aluminium-21, Oct. 3-5, 2017, Moscow, <https://www.aluminas.ru/upload/iblock/2c3/Prezentatsiya-Airbus-Helicopters_2.pdf>.

* cited by examiner

414

Surface Preparation 416

Electrodeposition of coating 418

Component rinsing 420

Component curing 422

Topcoat application 424

ELECTROLYTIC COATING FOR ALUMINUM COMPONENTS WITH WELD JOINTS

BACKGROUND

The present disclosure relates generally to protective coatings for metal substrates and, more particularly, an epoxy coating and the application thereof.

Aluminum and aluminum alloy components used in aeronautics and aerospace applications are subjected to environments that cause corrosion. Such components have traditionally been anodized or conversion coated using chromic acid or anodized using sulfuric acid. Hexavalent chromium is heavily regulated by environmental agencies, and is banned in many countries, while either acid can be difficult to rinse away from certain components after processing, leading to cosmetic defects and/or corrosion. Thus, a need exists for improved coatings.

SUMMARY

A coated component includes a metallic body defining an inner volume configured to retain a fluid therein. The metallic body includes a plurality of segments, at least one weld joint attaching the plurality of segments, an outer surface, and an inner surface facing and defining the inner volume. The component further includes a chrome-free protective coating disposed on each of the outer surface and the inner surface. The coating includes an epoxy layer, and an oxide layer disposed between the epoxy layer and the respective outer surface and inner surface.

A coated component includes a metallic body defining an inner volume configured to retain a fluid therein. The metallic body includes a bracket, a weld joint attaching the bracket to the metallic body, an outer surface, and an inner surface facing and defining the inner volume. The component further includes a chrome-free protective coating disposed on each of the outer surface and the inner surface. The coating includes an epoxy layer, and an oxide layer disposed between the epoxy layer and the respective outer surface and inner surface.

A method of electrodepositing a protective coating on an aluminum component comprising at least one weld joint includes immersing the component in an electrodeposition bath, configuring the component as a positively-charged anode, applying voltage across the component to allow for deposition of the protective coating to form a coated component, rinsing the coated component, and curing the coated component.

Figure 1:
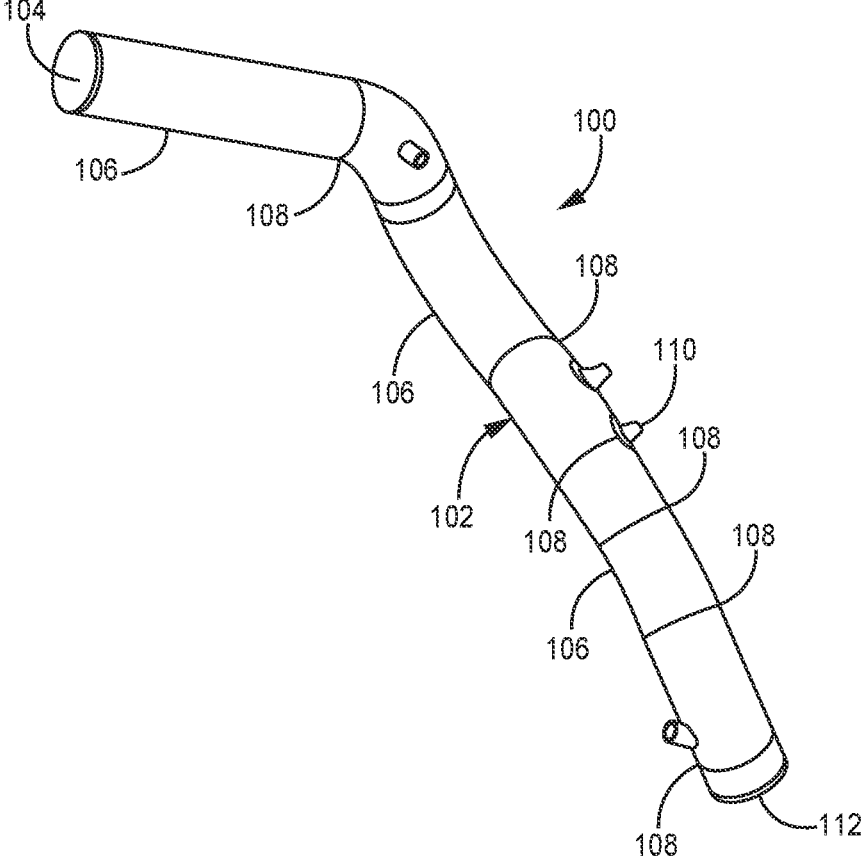
FIG. 1 is a perspective view of a first embodiment of a metallic duct.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

This disclosure presents an electrolytic chrome-free protective coating for welded aluminum components (i.e., those having weld joints). The coating is an electrodeposited anodic epoxy coating that includes a thin oxide layer for increased corrosion resistance, as well as adhesion of the subsequent organic coating. The coating is more environmentally friendly than chrome-based coatings and does not interact negatively with weld joints by way of electrolyte entrapment in crevices.

FIG. 1 is a perspective view of duct 100 suitable for retaining and/or transporting fluids (e.g., gases or liquids) within a larger fluid handling system. In an exemplary embodiment, duct 100 can be a gas-carrying duct as part of a bleed-air or environmental control system (ECS) of an aircraft. Duct 100 includes hollow metallic body 102 defining internal volume 104 within which fluid can be passed. In an exemplary embodiment, body 102 can be formed from aluminum (including aluminum alloys). Body 102 can be composed of multiple smaller segments 106 (not all are labeled in FIG. 1) attached by weld joints 108 (not all are labeled in FIG. 1). In the embodiment shown, segments 106 are hollow/tubular structures, so weld joints 108 fully circumscribe body 102 in order to fluidly seal body 102. Welding together smaller segments 106 allows for the formation of an elongate body 102 with precisely positioned straight and curved portions, as can be desirable in tight spaces (e.g., small compartments, bulkheads, etc.). Duct 100 further includes external features 110, which in the embodiment shown, are bosses (hereinafter "bosses 110"). Bosses 110 can also be connected to body 102 via weld joints 108. Bosses 110 can interconnect duct 100 to various mounting and/or support structures of the aircraft. Duct 100 can further include flanged ends 112, which can also be connected to body 102 by weld joints 108. Flanged ends 112 can help mate duct 100 to other ducts and/or components.

Figure 2:
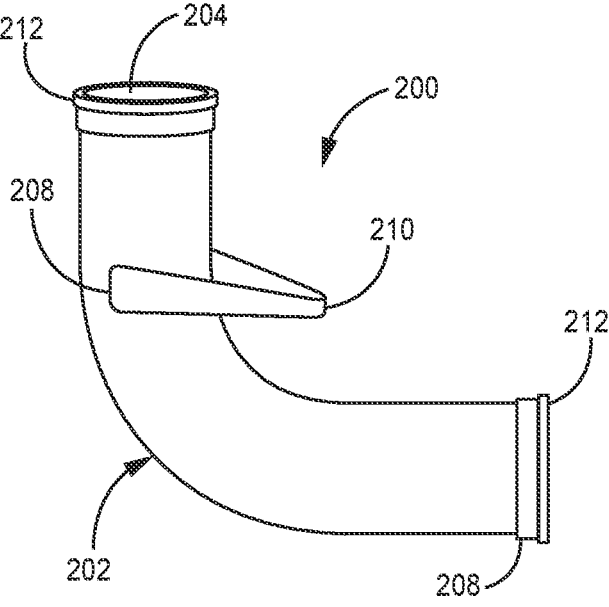
FIG. 2 is a perspective view of a second embodiment of a metallic duct.

FIG. 2 is a perspective view of duct 200, also suitable for carrying fluids. Duct 200 is similar to duct 100 in that it includes hollow body 202, preferably formed from aluminum, defining internal volume 204. Accordingly, duct 200 may be part of the same fluid handling system as duct 100, or a different system. Hollow body 202 is curved such that fluid passing therethrough turns roughly 90°. Duct 200 includes external feature 210, which in the embodiment shown is a bracket (hereinafter "bracket 210"). Bracket 210 can also be formed from aluminum or other metal and attached to body 202 by weld joint 208. Duct 200 can further include flanged ends 212, each attached via a weld joint 208, for interfacing duct 200 to another duct (e.g., duct 100) and/or component.

Figure 3:
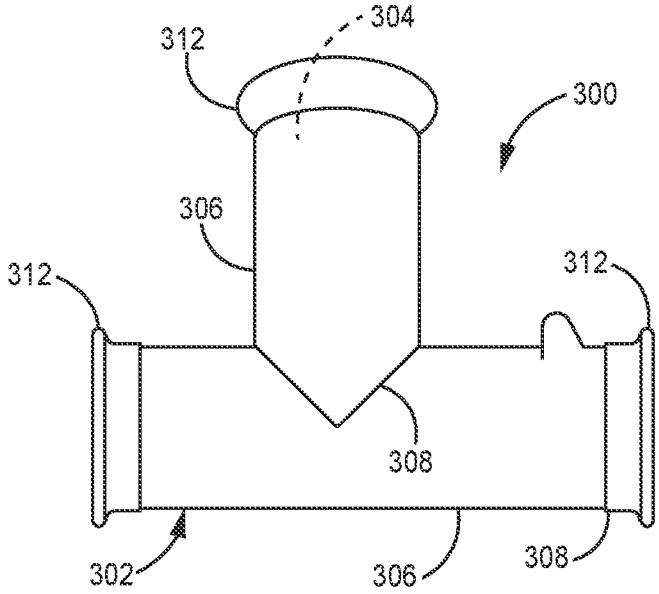
FIG. 3 is a perspective view of a third embodiment of a metallic duct.

FIG. 3 is a perspective view of duct 300, also suitable for carrying fluids. Duct 300 is similar to ducts 100 and 200 in that it includes hollow body 302, preferably formed from aluminum, defining internal volume 304 (indicated with a dashed lead line). Duct 300 is a tee for transitioning fluid flow 90° and includes orthogonally disposed straight segments 306. Duct 300 can alternatively be used to introduce a first fluid flow traveling at a first direction into a second fluid flow traveling at a second, orthogonal direction. Angled weld joint 308 attaches one segment 306 to the other. Weld joint 308 is referred to as angled because it is disposed at an angle relative to segments 306. Duct 300 can also include flanged ends 312, each attached via (circumferential) weld joint 308, for interfacing duct 300 to another duct (e.g., duct 100 and/or duct 200) and/or component.

Figure 4:
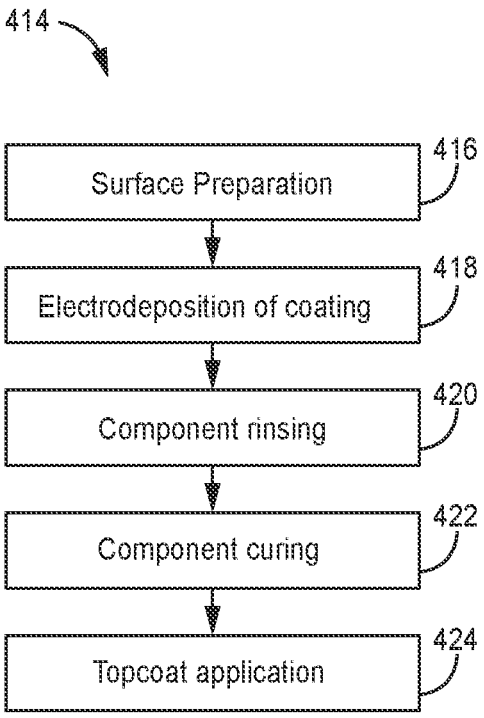
FIG. 4 is a flowchart illustrating a method of electrodepositing a protective coating on a metallic component.
Figure 5:
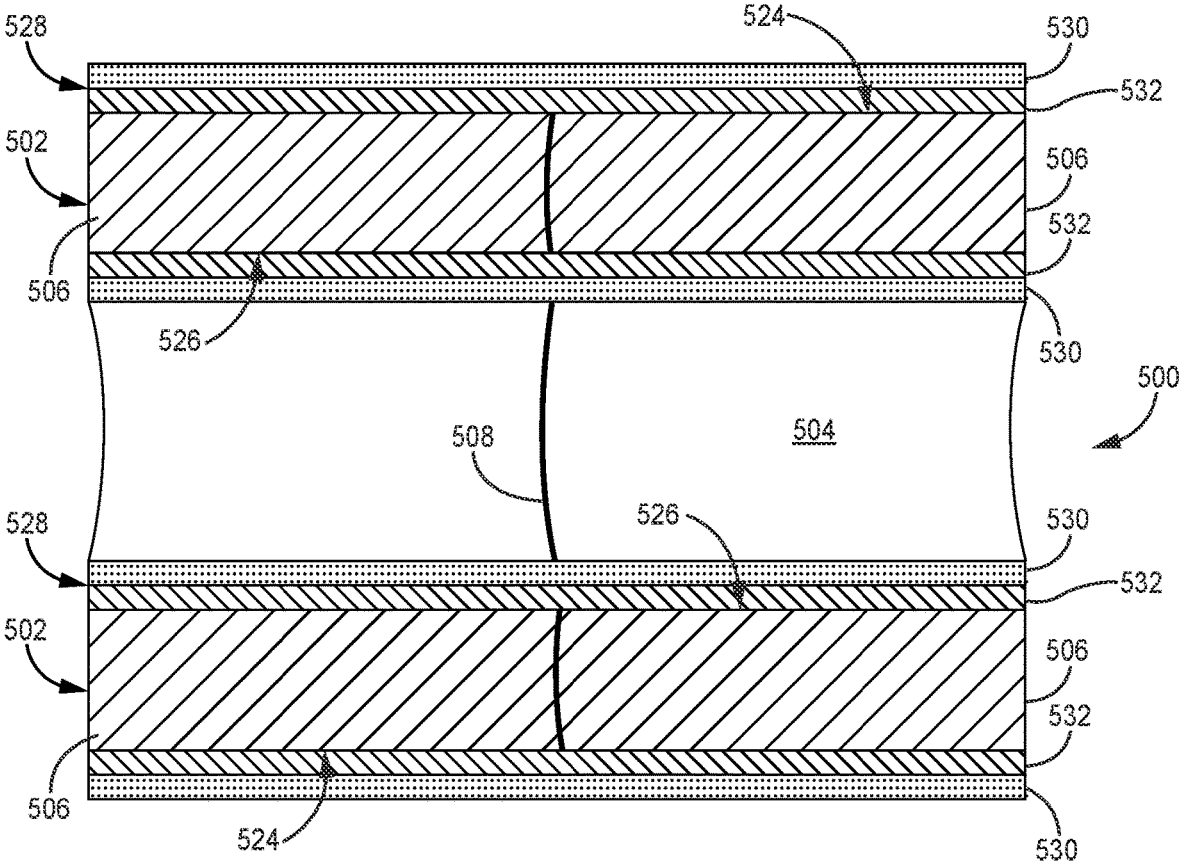
FIG. 5 is a simplified cross-sectional illustration of a coated metallic component.

Ducts 100, 200, and/or 300 can ideally include a protective (e.g., corrosion resistant) coating. When anodizing such welded aluminum components with chromic acid and/or sulfuric acid, the acid can become trapped in the weld joints, even after thorough rinsing of the component. Accordingly, FIG. 4 illustrates steps 416 to 424 of method 414 for electrodepositing a protective coating on a welded aluminum component to form a coated component. As used herein with respect to method 414, "electrodeposition" and "electrodepositing" refer to anodic electrodeposition. FIG. 5 is a simplified cross-sectional illustration of tubular coated component 500. FIGS. 4 and 5 are discussed together.

Coated component 500 can be a duct substantially similar to any of ducts 100, 200, or 300. Coated component 500 includes body 502 formed from segments 506 attached at weld joint 508. Body 502 defines internal volume 504 through which fluid can pass. Also visible in FIG. 5 are respective outer and inner surfaces 524 and 526 of body 502. As shown, weld joint 508 extends generally orthogonally between respective outer and inner surfaces 524 and 526. At step 416, body 502 can undergo optional preparation of surfaces 524 and 526, such as degreasing, rinsing, deoxidation, and further rinsing. Each sub-step can be carried out by immersing component 500 in a bath of the appropriate solution. Such surface preparation can facilitate the subsequent electrodeposition step.

At step 418, protective coating 528 can be electrodeposited on body 502, and more specifically, surfaces 524 and 526. Coating 528 can be a chrome-free water-based epoxy coating (or primer) in an exemplary embodiment. Body 502 is immersed in an electrocoat bath and positively charged, such that body 502 is the anode. In this regard, coating 528 can be an anodic coating. Coating 528 deposits relatively uniformly on each of outer and inner surfaces 524 and 526, respectively. In some cases, coating 528 can be slightly thinner on inner surface 526 relative to its thickness on outer surface 524. Coating 528 is generally coextensive with the areas of respective outer and inner surfaces 524 and 526, as body 502 is fully immersed in the electroplating bath. The thickness of coating 528 can be controlled by one or a combination of immersion time and applied voltage. Coating 528 includes epoxy layer 530 and relatively thin oxide (e.g., $Al_2O_3$) layer 532 formed initially during electrodeposition. Oxide layer 532 can be a dense layer of oxide filaments. Oxide layer 532 can anchor epoxy layer 530 to the underlying aluminum, and thus imparts greater corrosion resistance to surfaces 524 and 526 than epoxy layer 530 alone.

After electrodeposition, the now coated component 500 can be rinsed at step 420. Rinsing can include the immersion of component 500 in one or more vats of a rinsing solution. At step 422, component 500 can be placed into an oven to cure coating 528 at a temperature ranging from 100° C. to about 120° C. At step 424, optional additional coatings, such as a topcoat, can be applied over cured coating 528.

Coating 528 and method 414 have many benefits. First, coating 528 does not involve corrosive materials that can become trapped within weld joints which may lead to discoloration and/or corrosion of a component. Electrodeposition is more controlled than, for example, spray coating techniques, such that coating 528 can be more uniformly applied, and in less time. This includes more uniform deposition on inner surfaces of complexly-shaped components. Coating 528 and method 414 are also environmentally friendly. Coating 528 is chrome-free, low VOC (volatile organic compound), and low solvent emission. Method 414 can be automated, for example, using a robotic arm or gantry to transfer component 500 between vats and finally, the oven. Automation and the lack of harmful chemicals minimizes workers' exposure to any hazardous materials during the coating process. Finally, coating 528 can be applied in fewer steps than traditional protective coatings, and automation reduces processing time on a per-component basis.

Coating 528 can be applied to aluminum components in both commercial and military aviation, and therefore meets all relevant standards (e.g., MIL-STD), as well as international environmental standards.

Discussion of Possible Embodiments

The following are non-exclusive descriptions of possible embodiments of the present invention.

A coated component includes a metallic body defining an inner volume configured to retain a fluid therein. The metallic body includes a plurality of segments, at least one weld joint attaching the plurality of segments, an outer surface, and an inner surface facing and defining the inner volume. The component further includes a chrome-free protective coating disposed on each of the outer surface and the inner surface. The coating includes an epoxy layer, and an oxide layer disposed between the epoxy layer and the respective outer surface and inner surface.

The component of the preceding paragraph can optionally include, additionally and/or alternatively, any one or more of the following features, configurations and/or additional components:

In the above component, the component can be a fluid duct.

In any of the above components, the metallic body can include aluminum.

In any of the above components, the plurality of segments can include a first tubular segment and a second tubular segment, and the at least one weld joint can include a first weld joint fully circumscribing the metallic body.

Any of the above components can further include a third tubular segment attached to the second tubular segment by a second weld joint. The second weld joint can fully circumscribe the metallic body.

In any of the above components, one of the first, second, and third tubular segments can be straight, and wherein another of the first, second, and third tubular segments can be curved.

Any of the above components can further include a boss attached to at least one of the first, second, and third tubular segments.

In any of the above components, the plurality of segments can include a first tubular segment and a second tubular segment disposed orthogonally to the first tubular segment.

In any of the above components, the at least one weld joint can be an angled weld joint.

Any of the above components can further include at least one flanged end.

In any of the above components, the at least one flanged end can be attached to the metallic body via a weld joint.

In any of the above components, the at least one flanged end can include three flanged ends.

A coated component includes a metallic body defining an inner volume configured to retain a fluid therein. The metallic body includes a bracket, a weld joint attaching the bracket to the metallic body, an outer surface, and an inner surface facing and defining the inner volume. The component further includes a chrome-free protective coating disposed on each of the outer surface and the inner surface. The coating includes an epoxy layer, and an oxide layer disposed between the epoxy layer and the respective outer surface and inner surface.

The component of the preceding paragraph can optionally include, additionally and/or alternatively, any one or more of the following features, configurations and/or additional components:

In the above component, the component can be a fluid duct.

In any of the above components, the metallic body can include aluminum.

A method of electrodepositing a protective coating on an aluminum component comprising at least one weld joint includes immersing the component in an electrodeposition bath, configuring the component as a positively-charged anode, applying voltage across the component to allow for deposition of the protective coating to form a coated component, rinsing the coated component, and curing the coated component.

The method of the preceding paragraph can optionally include, additionally and/or alternatively, any one or more of the following features, configurations and/or additional components:

The above method can further include prior to immersing the component in the electrodeposition bath, degreasing an inner surface and outer surface of the component.

In any of the above methods, the protective coating can include an epoxy layer, and an oxide layer disposed between the epoxy layer and the respective outer surface and inner surface.

Any of the above methods can further include after the step of curing the component, applying a topcoat to the coated component.

In any of the above methods, the component is a fluid duct.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A coated component comprising:
a metallic body defining an inner volume configured to retain a fluid therein, the metallic body comprising:
    a plurality of segments;
    at least one weld joint attaching the plurality of segments;
    an outer surface; and
    an inner surface facing and defining the inner volume; and
an electrolytic chrome-free protective coating anodically electrodeposited on each of the outer surface, the inner surface, and the at least one weld joint of the metallic body, the protective coating comprising:
    an epoxy layer; and
    an oxide layer comprising oxide filaments anchoring the epoxy layer to the respective outer surface, the inner surface, and the at least one weld joint.

2. The component of claim 1, wherein the coated component is a fluid duct.

3. The component of claim 2, wherein the metallic body comprises aluminum.

4. The component of claim 3, wherein the plurality of segments comprises a first tubular segment and a second tubular segment, and wherein the at least one weld joint comprises a first weld joint fully circumscribing the metallic body.

5. The component of claim 4, and further comprising:
a third tubular segment attached to the second tubular segment by a second weld joint;
wherein the second weld joint fully circumscribes the metallic body.

6. The component of claim 5, wherein one of the first, second, and third tubular segments is straight, and wherein another of the first, second, and third tubular segments is curved.

7. The component of claim 6 and further comprising: a boss attached to at least one of the first, second, and third tubular segments.

8. The component of claim 3, wherein the plurality of segments comprises a first tubular segment and a second tubular segment disposed orthogonally to the first tubular segment.

9. The component of claim 8, wherein the at least one weld joint is an angled weld joint.

10. The component of claim 9 and further comprising: at least one flanged end.

11. The component of claim 10, wherein the at least one flanged end is attached to the metallic body via the at least one weld joint.

12. The component of claim 11, wherein the at least one flanged end comprises three flanged ends.

13. A method of anodically electrodepositing a chrome-free protective coating on an aluminum component comprising a plurality of segments, at least one weld joint attaching the plurality of segments, an outer surface, and an inner surface, the method comprising:
immersing the component in an electrodeposition bath comprising a chrome-free protective coating material;
configuring the component as a positively-charged anode;
applying voltage across the component to allow for deposition of the chrome-free protective coating material to form a coated component comprising an electrolytic chrome-free protective coating disposed on each of the outer surface, the inner surface, and the at least one weld joint;
rinsing the coated component; and
curing the coated component;
wherein the electrolytic chrome-free protective coating comprises:
    an epoxy layer; and
    an oxide layer comprising oxide filaments anchoring the epoxy layer to the respective outer surface, the inner surface, and the at least one weld joint.

14. The method of claim 13 and further comprising: prior to immersing the component in the electrodeposition bath, degreasing an inner surface and outer surface of the component.

15. The method of claim 13 and further comprising: after the step of curing the component, applying a topcoat to the coated component.

16. The method of claim 13, wherein the component is a fluid duct.

* * * * *